(12) United States Patent
Dufour et al.

(10) Patent No.: US 11,817,579 B2
(45) Date of Patent: Nov. 14, 2023

(54) CATHODE COMPOSITION FOR LITHIUM-ION BATTERY

(71) Applicant: HUTCHINSON, Paris (FR)

(72) Inventors: Bruno Dufour, Champagne sur Seine (FR); Marc Zimmermann, Achenheim (FR); Ksenia Astafyeva, Montargis (FR); Melanie Leclerc, Amilly (FR)

(73) Assignee: HUTCHINSON, Paris (FR)

( * ) Notice: Subject to any disclaimer, the term of this patent is extended or adjusted under 35 U.S.C. 154(b) by 341 days.

(21) Appl. No.: 16/754,606

(22) PCT Filed: Sep. 27, 2018

(86) PCT No.: PCT/FR2018/052384
§ 371 (c)(1),
(2) Date: Apr. 8, 2020

(87) PCT Pub. No.: WO2019/073140
PCT Pub. Date: Apr. 18, 2019

(65) Prior Publication Data
US 2020/0358095 A1    Nov. 12, 2020

(30) Foreign Application Priority Data
Oct. 9, 2017  (FR) ...................................... 1759445

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0466* (2013.01); *H01M 4/1399* (2013.01);
(Continued)

(58) Field of Classification Search
CPC .. H01M 4/525; H01M 4/0466; H01M 4/1399; H01M 4/622; H01M 4/625;
(Continued)

(56) References Cited

U.S. PATENT DOCUMENTS

2016/0149263 A1* 5/2016 Hallac ............... H01M 10/0569
429/163
2016/0340476 A1* 11/2016 Sonntag ............... H01M 4/0435

FOREIGN PATENT DOCUMENTS

JP        2006169323 A  *  6/2006  ............ C08F 290/14
WO    WO 2015/124835 A1   8/2015

OTHER PUBLICATIONS

Machine translation of JP 2006169323A, Yui Koji, (Year: 2006).*
International Search Report dated Jan. 7, 2019 in PCT/FR2018/052384 filed Sep. 27, 2018, 2 pages.

* cited by examiner

*Primary Examiner* — Kwang Han
(74) *Attorney, Agent, or Firm* — Oblon, McClelland, Maier & Neustadt, L.L.P.

(57) ABSTRACT

The invention relates to a cathode composition usable in a lithium-ion battery, to a process for the preparation of this composition, to such a cathode and to a lithium-ion battery incorporating this cathode.

Figure 1:
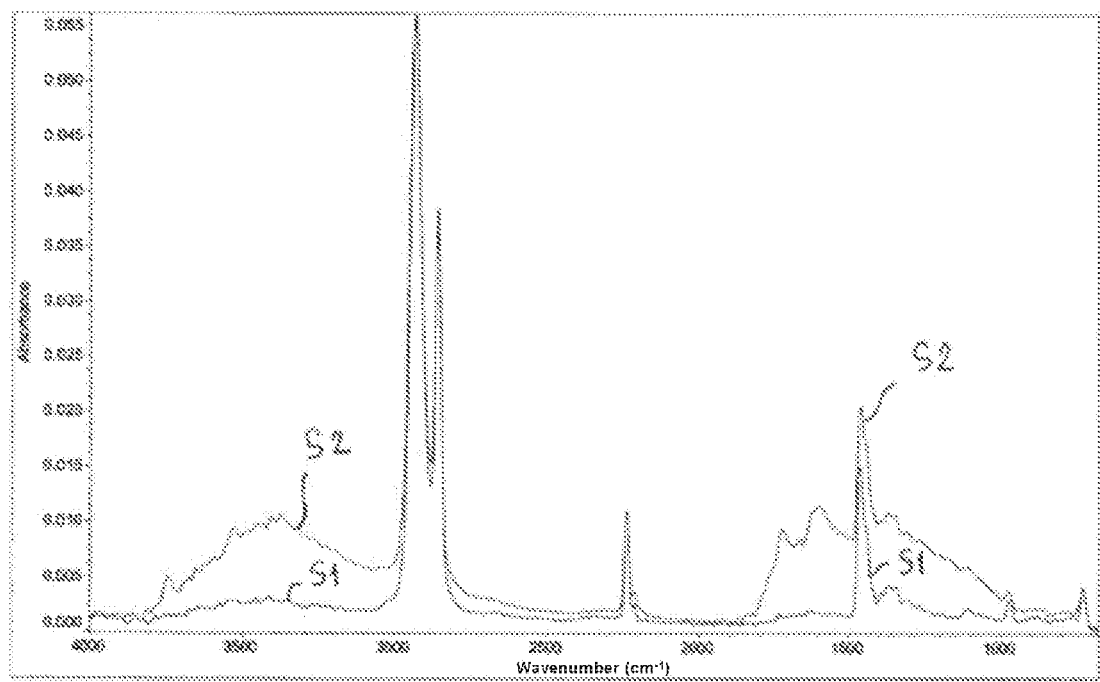

The composition comprises an active material which comprises an alloy of lithium nickel cobalt aluminum oxides, an electrically conductive filler and a polymeric binder, and it is such that said polymeric binder comprises at least one modified polymer (Id2) which is the product of a thermal oxidation reaction of a starting polymer and which incorporates oxygenated groups comprising CO groups, the composition being capable of being obtained by the molten route and without evaporation of solvent by being the product of said thermal oxidation reaction applied to a precursor mix- (Continued)

ture comprising said active material, said electrically conductive filler, said starting polymer and a sacrificial polymer phase.

18 Claims, 1 Drawing Sheet

(51) Int. Cl.
*H01M 4/1399* (2010.01)
*H01M 4/62* (2006.01)
*H01M 4/66* (2006.01)
*H01M 10/0525* (2010.01)
*H01M 10/0569* (2010.01)
*H01M 4/02* (2006.01)

(52) U.S. Cl.
CPC ........... *H01M 4/622* (2013.01); *H01M 4/625* (2013.01); *H01M 4/661* (2013.01); *H01M 10/0525* (2013.01); *H01M 10/0569* (2013.01); *H01M 2004/021* (2013.01)

(58) Field of Classification Search
CPC ............. H01M 4/661; H01M 10/0525; H01M 10/0569; H01M 2004/021; H01M 4/1391; H01M 4/624; H01M 4/131; H01M 4/0404; Y02E 60/10
See application file for complete search history.

CATHODE COMPOSITION FOR LITHIUM-ION BATTERY

The present invention relates to a cathode composition usable in a lithium-ion battery, to a process for the preparation of this composition, to such a cathode and to a lithium-ion battery, the or each cell of which incorporates this cathode.

There exist two main types of lithium storage batteries: lithium metal batteries, where the negative electrode is composed of metallic lithium (which material presents safety problems in the presence of a liquid electrolyte), and lithium-ion batteries, where the lithium remains in the ionic state.

Lithium-ion batteries are composed of at least two conductive faradaic electrodes of different polarities, the negative electrode or anode and the positive electrode or cathode, between which electrodes is found a separator which consists of an electrical insulator impregnated with an aprotic electrolyte based on $Li^+$ cations ensuring the ionic conductivity. The electrolytes used in these lithium-ion batteries usually consist of a lithium salt, for example of formula $LiPF_6$, $LiAsF_6$, $LiCF_3SO_3$ or $LiClO_4$, which is dissolved in a mixture of non-aqueous solvents, such as acetonitrile, tetrahydrofuran or most often a carbonate, for example ethylene carbonate or propylene carbonate.

A lithium-ion battery is based on the reversible exchange of the lithium ion between the anode and the cathode during the charging and discharging of the battery, and it has a high energy density for a very low weight by virtue of the physical properties of the lithium.

The active material of the anode of a lithium-ion battery is designed to be the seat of a reversible insertion/deinsertion of lithium and is typically composed of graphite (theoretical capacity of 370 mAh/g and redox potential of 0.05V with respect to the $Li^+/Li$ pair) or alternatively of mixed metal oxides, among which are listed lithium titanium oxides of formula $Li_4Ti_5O_{12}$, for example. With regard to the active material of the cathode, it is usually corn posed:

- of an oxide of at least one transition metal, such as in particular "NMC" alloys of lithium nickel manganese cobalt oxides or "NCA" alloys of lithium nickel cobalt aluminum oxides, or
- of a lithium iron phosphate.

These active materials make possible a reversible insertion/deinsertion of lithium in the anode and the cathode, and the greater their fractions by weight therein, the greater the capacity of the electrodes.

These electrodes also have to contain an electrically conductive compound, such as carbon black, and, in order to confer a sufficient mechanical cohesion thereon, a polymeric binder.

The electrodes of lithium-ion batteries are most often manufactured by a liquid-route process successively comprising a stage of dissolution or of dispersion of the ingredients of the electrode in a solvent, a stage of spreading the solution or dispersion obtained over a metal current collector and then, finally, a stage of evaporation of the solvent. The processes using an organic solvent (such as that presented in the document US-A1-2010/0112441) exhibit disadvantages in the environmental and safety fields, in particular owing to the fact that it is necessary to evaporate large amounts of these solvents, which are toxic or flammable. With regard to the processes using an aqueous solvent, their major disadvantage is that the electrode has to be dried very thoroughly before being able to be used, the traces of water limiting the working lifetime of the lithium batteries. Mention may be made, for example, of the document CN 106450201 A for the description of a process for the liquid-route manufacture of a lithium-ion battery cathode, which teaches the use, as active material, of an alloy of lithium NCA oxides combined with another alloy of lithium cobalt oxide (LCO) and, as binder, a polyvinylidene difluoride (PVDF).

Attempts have thus been made in the past to manufacture electrodes for lithium-ion batteries without use of solvents, in particular by melt processing techniques (for example by extrusion). Unfortunately, these melt processes cause major difficulties in the case of these batteries, which require a fraction by weight of active material in the polymeric mixture of the electrode of greater than 85% in order for the latter to exhibit a sufficient capacity within the battery. In point of fact, at such contents of active material, the viscosity of the mixture becomes very high and leads to risks of overheating of the mixture and of loss of mechanical cohesion after it has been processed. The document U.S. Pat. No. 5,749,927 presents a process for the continuous preparation by extrusion of electrodes of lithium-polymer batteries, which comprises a compounding of the electrode active material with an electrical conductor and a solid electrolyte composition comprising a polymeric binder, such as a polyacrylonitrile (PAN), a PVDF or polyvinylpyrrolidone (PVP), a lithium salt and a propylene carbonate/ethylene carbonate mixture in large excess with respect to this polymer. In this document, the fraction by weight of active material present in the anode polymer composition obtained is less than 70%, being clearly insufficient for a lithium-ion battery.

The document WO-A1-2013/090487 teaches, in its implementational examples, the use of a PVDF as binder in a substantially solvent-free process for preparing a cathode composition for a lithium-ion battery, the active material of which is an alloy of lithium NMC oxides, the cathode composition being deposited on a collector by buffing. This document mentions, in addition to such a fluorinated polyolefin, for example PVDF or a tetrafluoroethylene polymer, the possible use of unmodified polyolefins, such as those prepared from ethylene, propylene or butylene.

The document U.S. Pat. No. 6,939,383 teaches the use, as binder, in an electrode composition for a lithium-ion battery prepared without solvent in a multi-screw extruder, of an ionically conductive polyether comprising a polar polymer of an alkene oxide, such as an ethylene oxide/propylene oxide/allyl glycidyl ether copolymer, optionally combined with a nonionically conductive polymer, such as a PVDF, a PAN, PVP, an ethylene/propylene/diene terpolymer (EPDM) or a styrene/butadiene copolymer (SBR) prepared in emulsion. In the sole implementational example of this document, the fraction by weight of active material present in the electrode composition (a lithium vanadium oxide) is only 64.5%, which is clearly insufficient for a lithium-ion battery.

The document U.S. Pat. No. 7,820,328 teaches the use of a thermoplastic polymer as binder in an electrode composition for a lithium-ion battery prepared by the wet or dry route with thermal decomposition of a sacrificial polymer, such as ethyl cellulose, an acrylic resin, a polyvinyl alcohol, a polyvinyl butyral or a polyalkene carbonate. This decomposition is carried out under an inert atmosphere (i.e. non-oxidizing atmosphere, for example under argon) for an anode composition and under an atmosphere which is either inert or oxidizing (e.g., under air) for a cathode composition. This document does not contain an example of the preparation of an anode or cathode composition with a specific active material and a specific binder, indicating only that the conditions for decomposition of the sacrificial polymer are carefully controlled under an inert or oxidizing atmosphere in order not to degrade the other ingredients of the composition, such as the binder, which is thus not modified and can be chosen from polyethylenes, polypropylenes and fluorinated polyolefins, such as PVDF or PTFE. With regard to the active material for the cathode, it can include lithium nickel and/or cobalt oxides.

The document EP-B1-2 618 409 on behalf of the applicant company teaches the melt preparation without evaporation of solvent of a cathode composition for a lithium-ion battery comprising at least 90% of active material by weight (for example consisting of a carbon-coated lithium iron phosphate of formula C—LiFePO$_4$), a polymeric binder consisting of a crosslinked diene elastomer, such as a hydrogenated nitrile rubber (HNBR), and a nonvolatile organic compound usable in the electrolyte solvent of the battery.

The document WO-A2-2015/124835, also on behalf of the applicant company, presents a cathode composition for a lithium-ion battery prepared by the molten route and without evaporation of solvent, using a sacrificial polymer phase which is mixed with an active material (which can be a lithium oxide of a metal such as cobalt or manganese, or an alloy of lithium NMC oxides) and with a chosen polymeric binder compatible with this phase, in order to obtain a precursor mixture, and which is then removed in order to obtain an improved plasticization and an improved fluidity during the processing of the molten mixture, despite a fraction by weight of active material in the composition of greater than 80%. This document recommends, in its implementational examples, the use of a binder resulting from a polar elastomer (HNBR or ethylene/ethyl acrylate copolymer) for its compatibility with the sacrificial phase, itself also polar, which is a polyalkene carbonate, in order to avoid macroseparation of phases following the compounding of the ingredients and to control the processing, the integrity and the porosity of the composition, obtained by heat treatment of the precursor mixture in an oven under air in order to decompose the sacrificial phase. This document mentions as an alternative the possible use of other binder-forming polymers, subject to their compatibility with the sacrificial phase chosen, in order for the latter to be continuous in the precursor mixture in which the binder is in the dispersed or cocontinuous phase, it being possible for these other polymers to be chosen from polyolefins in the broad sense and elastomers, such as polyisoprenes. This compatibility constraint thus requires the use of a binder with a polarity similar to that of the sacrificial phase in order to avoid having two separate phases in the precursor mixture. With regard to the measured thickness of the cathode film obtained in the implementational examples of this document, it is 50 µm.

The electrode compositions presented in these last two documents are satisfactory overall for a lithium-ion battery; however, the applicant company has sought, during its recent research, to further improve the electrochemical properties of cathode compositions obtained by the molten route with this high content of active material.

An aim of the present invention is thus to provide a new cathode composition for a lithium-ion battery containing an active material according to more than 85% by weight, which is capable of being melt processed without solvent while being capable of conferring, on the cathode, an improved surface energy density in comparison with those obtained in the above-mentioned prior art, with a reversibility at the first charge/discharge cycle and a capacity and a cyclability (i.e., retention of the capacity after a multitude of cycles) which are increased or at least not compromised.

This aim is achieved in that the applicant company has just discovered, in a surprising way, that, if a precursor mixture obtained by a solvent-free melt process and comprising an active material specifically based on an alloy of lithium nickel cobalt aluminum (NCA) oxides, an electrically conductive filler, a starting polymer intended to form a binder and a sacrificial polymer phase is thermally oxidized under controlled conditions, then this starting polymer can advantageously be modified by oxygenated CO groups in order for the binder thus obtained to make it possible, by a synergistic effect with the NCA alloy, to obtain a composition forming a cathode film with a thickness and thus with a grammage which are much higher than in the prior art, without compromising the resistance of the film to cycling, which confers, on the cathode, an improved surface energy density and an improved robustness in operation in a lithium-ion battery.

In other words, a cathode composition according to the invention is usable in a lithium-ion battery, the composition comprising an active material which comprises an alloy of lithium nickel cobalt aluminum oxides, an electrically conductive filler and a polymeric binder, and this composition is such that said polymeric binder comprises at least one modified polymer which is the product of a thermal oxidation reaction of a starting polymer and which incorporates oxygenated groups comprising CO groups, the composition being capable of being obtained by the molten route and without evaporation of solvent by being the product of said thermal oxidation reaction applied to a precursor mixture comprising said active material, said electrically conductive filler, said starting polymer and a sacrificial polymer phase.

It should be noted that this functionalization of the binder combined with this cathode active material comprising or consisting of an alloy of NCA type advantageously makes it possible to obtain very high thicknesses and thus grammages (thicknesses which can exceed 150 µm and reach 250 µm, as explained below) for cathode films deposited on current collectors, and consequently high surface energy densities, without penalizing the robustness of these films in operation in a lithium-ion battery.

It should also be noted that this synergistic effect between the binder-forming polymer, thus modified, and the NCA active material is reflected in particular by an improved wettability of the cathode, which contributes to these improved electrochemical properties being obtained.

It should also be noted that the present invention is distinguished from the prior art of cathodes for a lithium-ion battery known to the applicant company by its use of the active material specifically of NCA type in a melt process without evaporation of solvent and not a process by the liquid route, which remains the most widespread to date.

According to another preferred characteristic of the invention, the composition, obtained by the molten route and without evaporation of solvent, is the product of said thermal oxidation reaction, which is applied to said precursor mixture, said sacrificial polymer phase being decomposed under an atmosphere comprising oxygen according to an oxygen partial pressure of greater than $10^4$ Pa and at an oxidation temperature of between 150° C. and 300° C. (preferably between 190° C. and 280° C.), the oxygen of said atmosphere reacting with said starting polymer to produce said at least one modified polymer.

According to a first aspect of the invention, the composition is capable of forming a film deposited on a metal current collector forming the cathode with said film, with a thickness of said film equal to or greater than 90 μm and preferably between 150 μm and 250 μm.

As explained below in connection with the cathode according to the invention, this unusually great thickness, which can exceed 150 μm and reach 250 μm, can be obtained in a single pass (i.e., a single sequence of compounding and depositing stages starting from a single precursor mixture) and it is advantageously accompanied by an excellent resistance of the cathode film obtained to the appearance of cracks or splits in cycling in the lithium-ion battery.

Generally, said sacrificial phase can comprise any polymer preferably exhibiting a thermal decomposition temperature lower by at least 20° C. than that of the binder, and more preferentially still at least one polymer of an alkene carbonate.

According to a preferential form of the invention, said sacrificial polymer phase can comprise at least one poly(alkene carbonate) polyol comprising end groups, more than 50 mol % (indeed even more than 80 mol %) of which comprise hydroxyl functional groups.

Advantageously, according to this preferential form, said at least one poly(alkene carbonate) polyol can be a linear aliphatic diol chosen from poly(ethylene carbonate) diols and poly(propylene carbonate) diols with a weight-average molecular weight Mw of between 500 g/mol and 5000 g/mol, preferably of between 700 g/mol and 2000 g/mol.

By way of example, a poly(propylene carbonate) diol of following formula can advantageously be used:

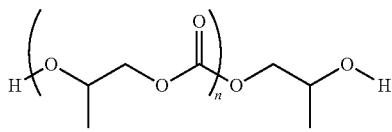

According to an example of said preferential form, said sacrificial polymer phase comprises:
- said poly(alkene carbonate) polyol with a weight-average molecular weight Mw of between 500 g/mol and 5000 g/mol, preferably according to a fraction by weight in said phase of less than 50% (for example of between 25% and 45%), and
- a poly(alkene carbonate) with a molecular weight Mw of between 20 000 g/mol and 400 000 g/mol, preferably according to a fraction by weight in said phase of greater than 50% (for example of between 55% and 75%).

It should be noted that this presence in a minor amount by weight, in the sacrificial phase, of poly(alkene carbonate) polyol with an Mw of between 500 and 5000 g/mol makes it possible unexpectedly to improve the plasticization and the fluidity of the precursor mixture during its melt processing and the mechanical strength of the composition obtained, in comparison with a predominant presence by weight in said phase of this poly(alkene carbonate) polyol.

More advantageously still according to said preferential form of the invention, the composition can additionally comprise a reactive polysiloxane or polyisocyanate compound, it then being possible for said at least one poly(alkene carbonate) polyol to be functionalized by grafting, to said end groups, siloxane or isocyanate groups which result from said reactive compound and which block these end groups.

It should be noted that the interaction of this reactive compound with the sacrificial polymer phase comprising this poly(alkene carbonate) polyol, which is thus modified by grafting said compound, makes it possible to solve a technical problem inherent in the use of NCA alloys, which lies in the fact that the NCAs catalyze an undesirable degradation of this sacrificial phase within the precursor mixture (i.e., before thermal decomposition of this phase), when this mixture is stored at ambient temperature (e.g., between 20° C. and 25° C.). This problem of stability of the precursor mixture, which softens and loses some of its cohesion as a result of the start of depolymerization of the poly(alkene carbonate) polyol catalyzed by the NCA, generally arises after a few hours of storage at ambient temperature, typically after approximately 6 hours for some NCAs.

In other words, said reactive compound of the invention makes it possible to carry out the process of the invention without having to immediately (i.e., within the few hours following its preparation) submit the precursor mixture to said thermal oxidation reaction in order to remove the sacrificial phase and to modify the starting polymer of the binder, making it possible to store the precursor mixture for an increased lifetime, for example equal to or greater than two days, by virtue of the blocking of the chain ends of the poly(alkene carbonate) polyol by this compound, which thus exerts a function of stabilization of the mixture by opposing the depolymerization of the poly(alkene carbonate) polyol.

The applicant company has confirmed that the use of this reactive compound does not interfere with the subsequent high-temperature degradation of the poly(alkene carbonate) polyol.

Preferably, said reactive compound is chosen from organodisiloxanes and organodiisocyanates, more preferentially still being an aliphatic disiloxane, such as, for example, hexamethylene disiloxane (HMDS), or an aliphatic diisocyanate, such as, for example, hexamethylene diisocyanate (HMDI).

However, it should be noted that other aliphatic or even aromatic disiloxanes and diisocyanates are usable, subject to their ability to block the chain ends of the poly(alkene carbonate) polyol.

Generally, a composition according to the invention can advantageously exhibit a porosity by volume, obtained by decomposition of said sacrificial polymer phase, of greater than 30% and preferably of between 35% and 60%.

According to a first form of the invention which can include said preferential form, said starting polymer for said polymeric binder comprises a nonhydrogenated acrylonitrile/butadiene copolymer (NBR) and/or a hydrogenated acrylonitrile/butadiene copolymer (HNBR) which can each exhibit a content by weight of units resulting from acrylonitrile equal to or greater than 40% and which is (are) crosslinked by said thermal oxidation reaction to give said at least one modified polymer.

According to this first form, said polymeric binder can advantageously consist of an NBR thus modified and/or of an HNBR thus modified.

Preferably, according to said first form of the invention, said starting polymer comprises a said hydrogenated acrylonitrile/butadiene copolymer (HNBR) which exhibits:
- a content by weight of units resulting from acrylonitrile equal to or greater than 44%, preferably equal to or greater than 48%, and/or
- an iodine value, measured according to the standard ASTM D5902-05, of greater than 10%.

According to a second form of the invention which can include said preferential form, said starting polymer is a nonpolar aliphatic polyolefin and said at least one modified polymer which results therefrom exhibits a content by weight of oxygen atoms of between 2% and 10% inclusive, preferably of between 3% and 7% inclusive.

According to this second form, said polymeric binder can advantageously be formed of at least one said nonpolar aliphatic polyolefin thus modified.

Advantageously, said oxygenated groups of said at least one modified polymer comprise some said CO groups and OH groups and preferably comprise C=O, C—O and —OH bonds which can define:

carbonyl groups, preferably comprising carboxylic acid, ketone and optionally also ester functional groups,
aldehyde groups, and
alcohol groups.

With reference to said second form, it should be noted that these oxygenated groups, coupled to this content by weight of oxygen of 2% to 10% (w/w content, for example measured by elemental analysis), are expressed by the fact that said at least one polymer modified by these groups is more polar than the starting nonpolar aliphatic polyolefin, while remaining nonpolar (i.e. slightly polar) overall by this functionalization, the content of which in the chain of the modified polyolefin is controlled so as to be sufficient (cf. content by weight of oxygen of at least 2%) but not too high (cf. content by weight of oxygen of at most 10%) for the targeted electrochemical properties, including the reversibility at the first cycle, the capacity, for example at a C/2 or C/5 rate, and the cyclability of the electrode (i.e., its capacity retention), to be obtained.

This is because the applicant company has established, during comparative tests, that an insufficient functionalization of the nonpolar aliphatic polyolefin (i.e., with said content by weight less than 2% and for example zero, the nonpolar polyolefin not being modified in this case) or an excessive functionalization of the nonpolar aliphatic polyolefin (i.e., with said content by weight greater than 10%) resulted in electrochemical properties which are at least partially unsatisfactory for a lithium-ion battery electrode, with in particular a first charge/discharge cycle efficiency and a capacity at a C/5 rate both insufficient for this application.

It should also be noted that this specific functionalization of the nonpolar aliphatic polyolefin, both by said groups which characterize it and by its degree of functionalization by these groups, makes it possible, unexpectedly in view of the teaching of the above-mentioned document WO-A2-2015/124835, to couple this nonpolar aliphatic polyolefin with a polar sacrificial phase (e.g., based on at least one alkene carbonate polymer), thus incompatible with this starting nonpolar polyolefin. Also surprisingly, this modified nonpolar aliphatic polyolefin according to the invention can be used in a lithium-ion battery with a polar electrolyte of this battery, as obvious below.

"Polyolefin" is understood to mean, in a known way, in the present description a polymer which is aliphatic or aromatic, homopolymer or copolymer ("copolymer" including, by definition, terpolymers), resulting from at least one alkene and optionally also from a comonomer other than an alkene.

"Aliphatic polyolefin" is understood to mean a nonaromatic hydrocarbon polyolefin, which can be linear or branched, thus excluding in particular the polymers of an alkene oxide, of alkene carbonate and the homopolymers and copolymers resulting from a vinylaromatic monomer, such as styrene.

It should be noted that the nonpolar aliphatic polyolefins usable according to the invention exclude polyolefins having polar functional groups, such as halogenated polyolefins, such as, for example, polyvinylidene fluorides or chlorides (PVDF or PVDC), polyhexafluoropropylenes and polytetrafluoroethylenes (PTFE).

More advantageously still, said nonpolar aliphatic polyolefin can be chosen from the group consisting of homopolymers of an aliphatic olefin, copolymers of at least two aliphatic olefins and their mixtures, preferably being:

a linear or branched nonhalogenated homopolymer of an aliphatic mono-olefin, which can be of:
thermoplastic type, for example chosen from polyethylenes (e.g., of low or high density, respectively LDPE or HDPE), polypropylenes (PP), polybut-1-enes and polymethylpentenes, or
elastomer type, for example chosen from polyisobutylenes;
or
a linear or branched nonhalogenated copolymer of two aliphatic mono-olefins, which can be of:
thermoplastic type, for example chosen from ethylene/octene (e.g., of the name Elite® 5230 G, without limitation), ethylene/butene, propylene/butene and ethylene/butene/hexene copolymers, or
elastomer type, for example chosen from copolymers of ethylene and of an α-olefin, such as ethylene/propylene copolymers (EPM) and ethylene/propylene/diene terpolymers (EPDM, such as, for example, EPDM products of the name Vistalon® 8600 (Exxon Mobil) or the name Nordel IP 5565 (Dow)).

According to said second form, said nonpolar aliphatic polyolefin is advantageously not crosslinked and can exhibit a content by weight of units resulting from ethylene of greater than 50%, for example being a copolymer of ethylene and of 1-octene and/or an EPDM.

It should be noted that these nonpolar aliphatic polyolefins, such as EPDM or polyethylenes, exhibit the advantage of being not very expensive, in particular in comparison with the HNBR products and ethylene/ethyl acrylate copolymers used in the prior art in the molten state.

According to a second aspect of the invention, the composition can comprise:

according to a fraction by weight of greater than 85% and preferably equal to or greater than 90%, said active material which comprises and advantageously consists of a said alloy of lithium nickel cobalt aluminum oxides of NCA type,
said polymeric binder according to a fraction by weight of less than 5%, preferably of between 1% and 4%, and
said electrically conductive filler, which is chosen from the group consisting of carbon blacks, cellulose-derived carbons, expanded graphites, carbon fibers, carbon nanotubes, graphenes and their mixtures, according to a fraction by weight of between 1% and 10%, preferably of between 6% and 9%, said sacrificial polymer phase being at least partially removed by said thermal oxidation applied to said precursor mixture.

It should be noted that this fraction by weight of more than 85% of said active material in the cathode composition contributes to conferring a high performance on the lithium-ion battery incorporating it.

It should also be noted that it is possible to incorporate, in a cathode composition according to the invention, one or other specific additives, in particular in order to improve or optimize its manufacturing process.

A cathode according to the invention of a lithium-ion battery is characterized in that the cathode comprises a metal current collector and a film covering it formed of a composition as defined above, said film exhibiting a thickness equal to or greater than 90 µm obtained in a single preparation pass of said precursor mixture by the molten route without solvent and being capable of resisting the appearance of splits or cracks after several charge/discharge cycles of the cathode within the lithium-ion battery.

In accordance with said first aspect of the invention, said film can advantageously exhibit, in a single pass, a thickness of between 150 µm and 250 µm and be capable of resisting the appearance of said splits or cracks after 20 charge/discharge cycles and preferably 40 charge/discharge cycles of the cathode, for example at a C/2 rate.

Advantageously, the cathode can be capable of conferring, on the lithium-ion battery incorporating it, a first charge/discharge cycle efficiency of greater than 70% when said first charge/discharge cycle is, for example, carried out between 4.3 V and 2.5 V at a C/5 rate.

Also advantageously, the cathode can be capable of conferring, on the lithium-ion battery incorporating it, for cycles carried out between 4.3 V and 2.5 V:
- a capacity at a C/5 rate of greater than 140 mAh/g of cathode, and/or
- a capacity at a C/2 rate of greater than 100 mAh/g of cathode, preferably of greater than 130 mAh/g of cathode, and/or
- a capacity retention rate at C/2 after 20 cycles and preferably also after 40 cycles, with respect to the first cycle, which is equal to or greater than 95%.

A lithium-ion battery according to the invention comprises at least one cell comprising an anode, a cathode and an electrolyte based on a lithium salt and on a nonaqueous solvent, and it is characterized in that the cathode is as defined above.

A process for the preparation according to the invention of a cathode composition as defined above successively comprises:
- a) a solvent-free melt compounding, for example in an internal mixer or an extruder, of ingredients of the composition comprising said active material, said starting polymer, said electrically conductive filler and said sacrificial polymer phase, in order for a precursor mixture of said composition to be obtained,
- b) a deposition, in film form, of said precursor mixture on a metal current collector, then
- c) said thermal oxidation reaction of said film under an atmosphere comprising oxygen according to an oxygen partial pressure of greater than $10^4$ Pa and at an oxidation temperature of between 150° C. and 300° C. for a variable duration of oxidation (which can vary from a few minutes to 30 minutes or more), for the total or partial removal of said sacrificial phase and for said at least one modified polymer to be obtained.

It should thus be noted that this sacrificial phase can be absent from the composition obtained or present in the latter in a degraded residual form.

According to said first aspect of the invention, stages a), b) and c) can be carried out in a single pass by a single film obtained from said precursor mixture, this film then exhibiting a thickness equal to or greater than 90 µm and preferably of between 150 µm and 250 µm.

According to said preferential form of the invention, said sacrificial phase used in this process can comprise said at least one poly(alkene carbonate) polyol having end groups, more than 50 mol % (indeed even more than 80 mol %) of which comprise hydroxyl functional groups, preferably a linear aliphatic diol chosen from poly(ethylene carbonate) diols and poly(propylene carbonate) diols with a molecular weight Mw of between 500 g/mol and 5000 g/mol.

According to said example of said preferential form, said sacrificial polymer phase used in this process of the invention comprises:
- said poly(alkene carbonate) polyol with a molecular weight Mw of between 500 g/mol and 5000 g/mol (liquid at ambient temperature and at atmospheric pressure), preferably according to a fraction by weight in said phase of less than 50%, and
- a poly(alkene carbonate) with a molecular weight Mw of between 20 000 g/mol and 400 000 g/mol (solid at ambient temperature and at atmospheric pressure), preferably according to a fraction by weight in said phase of greater than 50%.

As indicated above, this presence in a minor amount by weight in said phase of the poly(alkene carbonate) polyol with an Mw of between 500 and 5000 g/mol makes it possible to improve the plasticization and the fluidity of the precursor mixture and the mechanical strength of the composition which results from it.

Advantageously, according to said preferential form of the invention, said ingredients mixed in stage a) can also comprise said reactive polysiloxane or polyisocyanate compound, which reacts during said compounding with said at least one poly(alkene carbonate) polyol by functionalizing it by grafting, to said end groups, siloxane or isocyanate groups resulting from said reactive compound, which is preferably chosen from organodisiloxanes, such as aliphatic disiloxanes, and organodiisocyanates, such as aliphatic diisocyanates.

With regard to the fraction by weight of said reactive compound in the precursor mixture, it is preferably between 0.1% and 2%.

As explained above, the use of this reactive compound makes it possible to simplify the process by allowing storage of the precursor mixture for an increased lifetime (e.g., at least two days), by virtue of the blocking of the chain ends of the poly(alkene carbonate) polyol by this compound, which opposes the depolymerization of the poly(alkene carbonate) polyol and thus stabilizes this mixture at ambient temperature, waiting for the oxidizing heat treatment.

Generally, it is advantageously possible to carry out stage c) by a controlled rise in temperature from a starting temperature preferably of between 40° C. and 60° C. to said oxidation temperature and then by an isotherm at this oxidation temperature during said duration of oxidation, in order to thermally decompose said sacrificial phase and to modify said starting polymer so that said at least one modified polymer exhibits said oxygenated groups comprising some said CO groups.

With reference to said first and second forms of the invention, it should be noted that said thermal oxidation reaction is thus controlled in order for, in the composition obtained, said starting polymer to be modified as specified above (e.g., with, in this second form, the content by weight of oxygen atoms in the polymer modified by oxygenated groups CO and OH which is between 2% and 10% inclusive). This is because this process of the invention requires precise control of said reaction in order to obtain this specific functionalization, the conditions of temperature, pressure and duration of thermal oxidation being adjusted to the starting polymer chosen.

According to said first form of the invention, optionally including said preferential form, said starting polymer used in stage a) comprises a nonhydrogenated acrylonitrile/butadiene copolymer (NBR) and/or a hydrogenated acrylonitrile/ butadiene copolymer (HNBR) which each exhibit(s) a content by weight of units resulting from acrylonitrile equal to or greater than 40% and which is (are) crosslinked in stage c) by said thermal oxidation reaction.

It should be noted that the starting polymer according to this first form is present in the precursor mixture of stage a) without macroseparation of phases between binder and sacrificial phase when the latter is in accordance with said preferential form (i.e., at least one poly(alkene carbonate) polyol).

According to said second form of the invention, said starting polymer used in stage a) comprises a nonpolar aliphatic polyolefin preferably chosen from the group consisting of thermoplastic and elastomeric homopolymers of an aliphatic mono-olefin, thermoplastic and elastomeric copolymers of at least two aliphatic mono-olefins and their mixtures, said nonpolar aliphatic polyolefin being modified in stage c) in order to give said at least one modified polymer, which exhibits a content by weight of oxygen atoms of between 2% and 10% inclusive, and in said precursor mixture obtained in stage a).

It should be noted that the starting polymer according to this second form is present in the precursor mixture of stage a) with macroseparation of phases between the binder and the sacrificial phase, thus forming two separate phases, when the sacrificial phase is in accordance with said preferential form.

It should be noted that it is thus advantageously possible to dispense with any compatibilizing compound in order to obtain the composition of the invention, despite the incompatibility between said nonpolar aliphatic polyolefin and said sacrificial polymer phase, which on the contrary is polar.

Thus, said second form of the invention goes against the teaching of the above-mentioned document WO-A2-2015/124835, owing to the fact that it uses, for the binder, a nonpolar starting polymer not compatible with the polar sacrificial phase in said preferential form (and also incompatible with the electrolyte, also polar, used for the battery), which starting polymer is a nonpolar aliphatic polyolefin (i.e., excluding, in the family of the polyolefins, aromatic polyolefins and polar polyolefins) and is modified in a very specific and controlled manner in the composition obtained after removal of the sacrificial phase, by addition of these oxygenated groups so that said at least one modified polymer satisfies the above-mentioned restricted range for its content by weight of oxygen.

Figure 2:
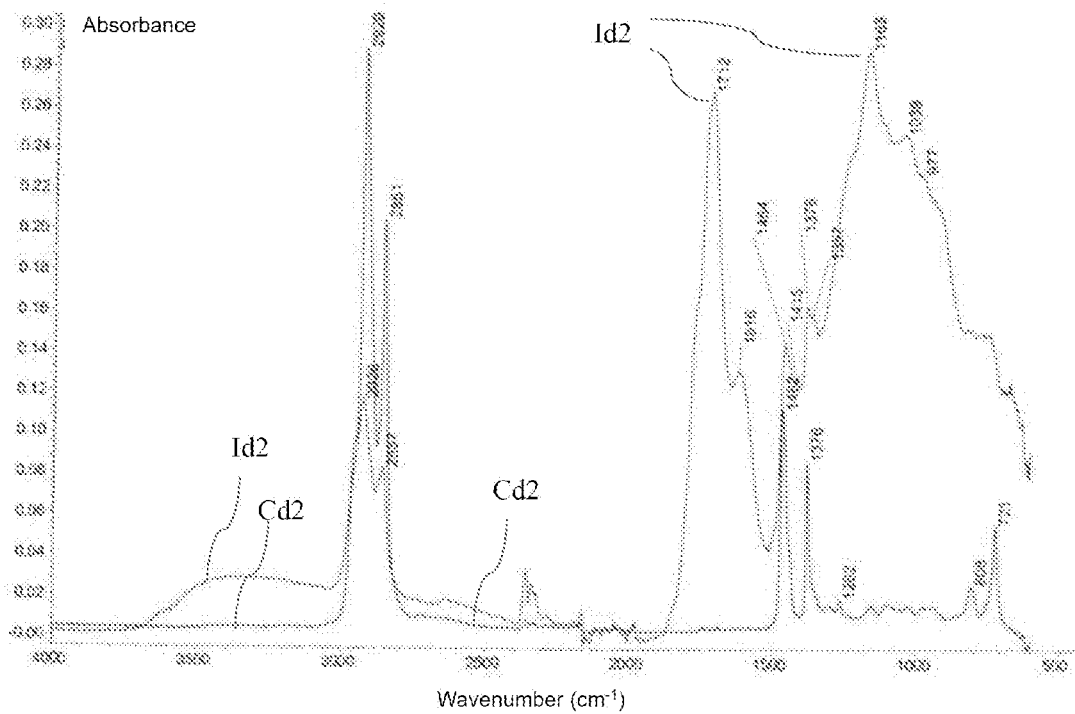

Other characteristics, advantages and details of the present invention will emerge on reading the following description of several implementational examples of the invention, given by way of illustration and without limitation in connection with the attached drawing, in which:

FIG. 1 is a graph illustrating the absorbance spectra measured by Fourier transform infrared spectroscopy (FTIR for short) showing the change in the absorbance as a function of the wavenumber of two elastomeric films composed of a first control binder formed of an HNBR which is unmodified and of a first binder according to the invention formed of the same HNBR which is modified, and FIG. 2 is a graph illustrating the absorbance spectra measured by FTIR showing the change in the absorbance as a function of the wavenumber of two elastomeric films composed of a second control binder formed of an EPDM which is unmodified and of a second binder according to the invention formed of the same EPDM which is modified.

CONTROL EXAMPLES AND EXAMPLES ACCORDING TO THE INVENTION OF CATHODES FOR A LITHIUM-ION BATTERY PREPARED BY THE MOLTEN ROUTE

In all these examples, the following ingredients were used:
a) as active ingredients, two NCA alloys of lithium nickel cobalt aluminum oxides (Targray) of respective grades:
  a1) SNCA01001; and
  a2) SNCA04001;
b) as conductive fillers, a carbon black Super C65 (Timcal) and a carbon-based agent CMC derived from cellulose (Pyrograph);
c) as sacrificial polymer phase, a blend of two polypropylene carbonates (PPC): one liquid and having diol functional group of the name Converge® Polyol 212-10 from Novomer, and the other solid of the name QPAC® 40 from Empower Materials, present in this sacrificial phase according to respective fractions by weight of approximately 65%-35% or 35%-65%;
d) as starting polymers intended to form the binder:
  d1) a Zetpol® 0020 HNBR (Zeon Chemicals) exhibiting an acrylonitrile content of 50% and an iodine number of 23; and
  d2) a Vistalon® 8600 EPDM (Exxon Mobil) terpolymer according to the invention exhibiting a content by weight of ethylene of 58.0% and a content of ethylidenenorbornene (ENB) of 8.9%;
e) as stabilizing agent, hexamethylenedisiloxane (HMDS), Sigma-Aldrich.

Protocol for the Melt Processing of Cathodes

Eight cathode compositions according to the invention I1-I8 based on the ingredients a1) or a2), b), c), d1) or d2) and optionally e) (for the single composition I2) were melt processed by means of an internal mixer of Haake Polylab OS type, with a capacity of 69 cm$^3$ and at a temperature of between 60° C. and 75° C.

The mixtures thus obtained were calendered at ambient temperature using a Scamex external open mill until a thickness of 600 µm was reached, then they were calendered again at 70° C. in order to reach a thickness ranging from 90 µm to 250 µm. The films consisting of the precursor mixtures thus obtained were deposited on an aluminum collector coated with carbon using a sheet calender at 70° C.

The cathode precursor films thus prepared were placed in a ventilated oven in order to extract the sacrificial phase (solid and liquid PPCs) therefrom. They were subjected to a controlled temperature gradient from 50° C. to 250° C. and then to an isotherm at 250° C. for 30 min, while subjecting them to a thermal oxidation under ambient air, in order to decompose this sacrificial phase and to functionalize the corresponding binder d1) or d2).

An example of a control composition C1 was also produced with the precursor mixture of the composition I8 subjected to the same heat treatment as the precursor mixture of I8 but not in accordance with the invention because under an inert (i.e., nonoxidizing) atmosphere, in a rotary oven under nitrogen with a nitrogen flow rate of 1 l/min.

Compositions according to the invention I1, I2, I3, I4, I6 and I7, each comprising a binder consisting of said modified HNBR, and compositions according to the invention I5 and I8, each comprising a binder consisting of said modified EPDM, with respective fractions by weight of the two liquid and solid PPCs in the sacrificial phase of approximately 65%-35% for I1-I2 and approximately 35%-65% for I3-I8, were thus obtained.

The characteristics of the precursor mixtures and compositions obtained (fractions by weight) are listed in table 1 below.

TABLE 1

|  | Before extraction (% w) | After extraction (% w) |
|---|---|---|
| I1 | | |
| HNBR (Zetpol ® 0020) | 2.5 | 3.0 |
| Carbon black C65 | 5.8 | 7.0 |
| PPC Converge ® Polyol 212-10 | 11.1 | 0 |
| PPC QPAC ® 40 | 6.0 | 0 |
| SNCA04001 | 74.6 | 90.0 |
| I2 | | |
| HNBR (Zetpol ® 0020) | 2.5 | 3.0 |
| Carbon black C65 | 5.7 | 7.0 |
| PPC Converge ® Polyol 212-10 | 11.0 | 0 |
| PPC QPAC ® 40 | 5.9 | 0 |
| SNCA04001 | 74.0 | 90.0 |
| HMDS | 0.9 | 0 |
| I3 | | |
| HNBR (Zetpol ® 0020) | 2.5 | 3.0 |
| Carbon black C65 | 5.8 | 7.0 |
| PPC Converge ® Polyol 212-10 | 6.0 | 0 |
| PPC QPAC ® 40 | 11.1 | 0 |
| SNCA04001 | 74.6 | 90.0 |
| I4 | | |
| HNBR (Zetpol ® 0020) | 2.2 | 3.0 |
| Carbon black C65 | 5.2 | 7.0 |
| PPC Converge ® Polyol 212-10 | 8.9 | 0 |
| PPC QPAC ® 40 | 16.4 | 0 |
| SNCA04001 | 67.2 | 90.0 |
| I5 | | |
| EPDM (Vistaion ® 8600) | 2.2 | 3.0 |
| Carbon black C65 | 5.2 | 7.0 |
| PPC Converge ® Polyol 212-10 | 9.0 | 0 |
| PPC QPAC ® 40 | 16.7 | 0 |
| SNCA04001 | 66.9 | 90.0 |
| I6 | | |
| HNBR (Zetpol ® 0020) | 1.5 | 1.8 |
| Carbon black C65 | 6.8 | 8.2 |
| PPC Converge ® Polyol 212-10 | 5.9 | 0 |
| PPC QPAC ® 40 | 10.9 | 0 |
| SNCA01001 | 74.9 | 90.0 |
| I7 | | |
| Binder: HNBR (Zetpol ® 0020) | 1.3 | 1.8 |
| Carbon black C65 | 3.9 | 5.4 |
| CMC (Pyrograph) | 1.9 | 2.8 |
| PPC Converge ® Polyol 212-10 | 10.1 | 0 |
| PPC QPAC ® 40 | 18.9 | 0 |
| SNCA01001 | 64.0 | 90.0 |
| I8 | | |
| EPDM (Vistaion ® 8600) | 1.3 | 1.8 |
| Carbon black C65 | 3.9 | 5.4 |
| CMC (Pyrograph) | 1.9 | 2.8 |
| PPC Converge ® Polyol 212-10 | 10.2 | 0 |
| PPC QPAC ® 40 | 18.9 | 0 |
| SNCA01001 | 63.8 | 90.0 |

The compositions obtained I1-I8 each exhibited a fraction by weight of active material, consisting of an NCA alloy, equal to 90%, and a fraction by weight of modified binder according to the invention Id1) or Id2), respectively consisting of said HNBR or of said EPDM, ranging from 1.8% (compositions I6-I8) to 3% (compositions I1-I5).

The precursor mixture from which the composition I2 comprising a stabilizing agent (HMDS) results could advantageously be stored at ambient temperature for more than 48 hours, effectively opposing the depolymerization of the liquid PPC/solid PPC sacrificial phase due to the action of the NCA active material.

The porosity by volume of the compositions I1-I3 and I6 was 37.7%, that of the compositions I4, I5, I7 and I8 was higher (approximately 50%).

Characterization of the Modified Binders According to the Invention:

The binders d1) and d2), unmodified and modified according to the invention during this melt process, were characterized by the FTIR (Fourier transform infrared spectroscopy) technique, which gives spectra of absorbance as a function of the wavenumber. To this end:

1) For the binder d1), a film consisting of said HNBR (Zetpol® 0020) with a thickness of 100 μm was deposited on copper, and it was treated at 240° C. under air for 30 minutes. This film was subsequently studied by FTIR in "ATR" mode (for "attenuated total reflectance").

FIG. 1 shows the two spectra obtained S1 and S2, respectively before and after this annealing. The spectrum S2, after this annealing, shows:

a slight decrease in the band at 2240 $cm^{-1}$, characteristic of the nitrile —C≡N groups, an appearance of a band in the vicinity of 1600 $cm^{-1}$ attributed to the appearance of C=C and C=N bonds, an appearance of a band in the vicinity of 1740 $cm^{-1}$ attributed to the appearance of C=O groups, and an appearance of a band between 3200 $cm^{-1}$ and 3500 $cm^{-1}$ approximately, attributed to C—OH bonds.

These bands are characteristic of the partial oxidation of the nitrile groups and of the crosslinking of the HNBR by oxidation/dehydration of these nitrile groups (which are considerably more numerous than the unsaturations resulting from butadiene due to the high level of ACN in the HNBR), as described under similar conditions, for example, in Ogawa et al., Carbon, Vol. 33, No. 6, p. 783, or Dalton et al., Polymer, 40 (1999), 5531-5543.

2) For the binder d2), five Cd2 films with a thickness of 100 μm, formed of the binder d2) consisting of EPDM Vistalon® 8600, were deposited on copper, by evaporation of a solution in heptane. The five Cd2 films thus deposited were then treated in a controlled manner at 250° C. under ambient air for 30 min, so as to obtain five Id2 films having a modified binder according to the invention each comprising CO and OH groups modifying d2). The Cd2 and Id2 films were subsequently studied by FTIR in "ATR" mode.

FIG. 2 shows the spectrum of EPDM Vistalon® 8600 of a Cd2 film not heat-treated (Cd2 incorporating the unmodified binder d2)) and the spectrum of the same EPDM of the Cd2 film but treated at 250° C. for 30 min, as indicated above, and it is seen that this last spectrum exhibits bands characteristic of the thermal oxidation of EPDM, such as a C=O bond at 1712 $cm^{-1}$, a CO bond at 1163 $cm^{-1}$ and an —OH bond at 3400 $cm^{-1}$. The content by weight of oxygen atoms in each of the five Id2 films of this EPDM thus modified was measured by elemental analysis, and a mean value of 5.9% was found for this content with a standard deviation of 0.29% for the five measurements.

Protocol for the Electrochemical Characterization of the Cathodes I1-I8 According to the Invention and Control C1 Prepared by the Molten Route The cathodes were cut out with a hole punch (diameter 16 mm, surface area 2.01 cm²) and weighed. The weight of active material was determined by subtracting the weight of the bare current collector prepared according to the same conditions (heat treatments). They were put in an oven directly connected to a glove box. They were dried at 100° C. under vacuum for 12 hours and then transferred into the glove box (argon atmosphere: 0.1 ppm $H_2O$ and 0.1 ppm $O_2$).

The button cells (CR1620 format) were subsequently assembled using a lithium metal counterelectrode, a Cellgard 2500 separator and a battery-grade electrolyte $LiPF_6$ EC/DMC (50%/50% ratio by weight). The cells were characterized on a Biologic VMP3 potentiostat, in charge/discharge cycles at constant current between 4.3 V and 2.5 V.

The rate was C/5, taking into account the weight of active material and a theoretical capacity of 170 mAh/g. In order to compare the performance qualities of the different systems, the capacities (expressed in mAh per g of cathode) were evaluated during the first discharge for lithium deinsertion (i.e., initial capacity after the first charge/discharge cycle), at the second discharge (measurement of the efficiency of the first cycle), after 20 cycles and after 40 cycles, in order to calculate the retention rate (in %) defined by the ratio of the capacity at 20 or 40 cycles to the capacity at the first cycle at a single given rate (C/2). In addition to the capacities at a C/5 and C/2 rate, the capacities at C, 2 C and 5 C rates were measured for these cathodes (all these capacities being expressed in mAh per g of cathode).

The characterization results for the cathodes I1-I8 within each cell thus obtained are given in table 2 below, it being specified that films of different thicknesses were obtained for each composition I4, I5, I6, I7 and I8, and that the above-mentioned control test was also carried out for the composition C1, resulting from the same precursor mixture as I8 but thermally degraded under a nitrogen (nonoxidizing) atmosphere.

TABLE 2

| | Thickness μm-Grammage mg/cm² | Efficiency 1$^{st}$ cycle | C/5 Capacity at the 1$^{st}$ cycle (mAh/g) | C/2 Capacity at the 1$^{st}$ cycle (mAh/g) | C Capacity at the 1$^{st}$ cycle (mAh/g) | 2C Capacity at the 1$^{st}$ cycle (mAh/g) | 5C Capacity at the 1$^{st}$ cycle (mAh/g) | C/2 Capacities at the 20$^{th}$ cycle-40$^{th}$ cycle (mAh/g) |
|---|---|---|---|---|---|---|---|---|
| I1 | 87 μm | 75% | | 133 | 110 | 46 | | |
| I2 | 95 μm | 75% | | 126 | 81 | — | | |
| I3 | 90 μm | 75% | | 128 | 78 | 24 | | |
| I4 | 75 μm 18 mg/cm² | 78% | | 143 | 121 | | | |
| I4 | 120 μm 25 mg/cm² | 77% | | 140 | 117 | | | |
| I5 | 76 μm 16 mg/cm² | 80% | | 150 | 125 | | | |
| I5 | 126 μm 28 mg/cm² | 78% | | 143 | 110 | | | |
| I6 | 78 μm | 76% | | 134 | 115 | 70 | 14 | |
| I6 | 113 μm | 75% | | 121 | 95 | 24 | 4 | |
| I6 | 142 μm | 75% | | 129 | 75 | 20 | — | |
| I6 | 192 μm | 71% | | 102 | 28 | 9 | — | |
| I7 | 67 μm | 75% | | 113 | 96 | 73 | — | |
| I7 | 70 μm | | 148 | 138 | | | | 134-132 |
| I7 | 124 μm | 75% | | 135 | 108 | — | — | |
| I7 | 218 μm | 74% | | 120 | 41 | 9 | — | |
| I8 | 89 μm | 76% | | 137 | 123 | 91 | 21 | |
| I8 | 124 μm | 75% | | 118 | 58 | 5 | — | |
| I8 | 205 μm | 73% | | 111 | 53 | 17 | — | |
| C1 | 89 μm | | No signal (capacity close to zero) | | | | | |

Table 2 shows that very high thicknesses are obtained, in particular for the cathode compositions I6 to I8 (thicknesses of greater than 150 μm, indeed even 200 μm), which generates surface energy densities which are also high for these cathodes according to the invention. It has been confirmed that the cathode films of these compositions I1-I8 according to the invention were devoid of splits or cracks during the cycling.

Table 2 also shows that these compositions I1-I8 of the invention make it possible to obtain high efficiencies at the first cycle (greater than 70%), testifying to a satisfactory reversibility, and capacities at C/5, C/2, C, 2 C and if appropriate 5 C rates which are also satisfactory.

Table 2 also shows a very satisfactory cyclability for the cathode film I7 of the invention exhibiting a thickness of 70 μm after 20 and even 40 cycles (see the C/2 capacity retention rate after 20 and 40 cycles, which is greater than 95%).

More specifically, the tests with the compositions:
I1 and I2 show that the use in I2 of HMDS as stabilizing agent does not really compromise the electrochemical properties of the cathode I2 in comparison with I1;
I1 and I3 show an improvement in the electrochemical properties of the cathode I1 obtained with a relative majority of liquid PPC with respect to the solid PPC, in comparison with the cathode I3 obtained with a relative minority of liquid PPC with respect to the solid PPC;
I4 and I5 show an improvement in the electrochemical properties of the cathode I5 obtained with a modified EPDM binder in comparison with the cathode I4 obtained with a modified HNBR binder; and I6, I7 and I8 show a limited effect on the electrochemical properties of the thickness of the cathode films and of the porosity by volume of the compositions I7 and I8, much higher than that of the composition I6.

The invention claimed is:

1. A cathode composition for a lithium-ion battery, the cathode composition comprising an active material which comprises an alloy of lithium nickel cobalt aluminum oxides, an electrically conductive filler and a polymeric binder,
wherein said polymeric binder comprises at least one modified polymer which is a product of a thermal oxidation reaction of a starting polymer and which incorporates oxygenated groups comprising CO groups and OH groups, in which the starting polymer
 (i) comprises a nonhydrogenated acrylonitrile/butadiene copolymer (NBR) and/or a hydrogenated acrylonitrile/butadiene copolymer (HNBR) which each exhibit(s) a content by weight of units resulting from acrylonitrile equal to or greater than 40%, the at least one modified polymer being crosslinked by the thermal oxidation reaction, or
 (ii) is a nonpolar aliphatic hydrocarbon polyolefin, the at least one modified polymer not being crosslinked and having a content by weight of oxygen atoms of between 2% and 10% inclusive,
the cathode composition being obtained by a molten route and without evaporation of solvent, the cathode composition being a product of said thermal oxidation reaction applied to a solvent-free precursor mixture comprising said active material, said electrically conductive filler, said starting polymer and a sacrificial polymer phase, said sacrificial polymer phase comprising at least one poly(alkene carbonate) polyol comprising end groups, more than 50 mol % of which comprise hydroxyl functional groups.

2. The cathode composition of claim 1, wherein the cathode composition is the product of said thermal oxidation reaction which is applied to said solvent-free precursor mixture, said sacrificial polymer phase being decomposed under an atmosphere comprising oxygen according to an oxygen partial pressure of greater than $10^4$ Pa and at an oxidation temperature of between 150° C. and 300° C., the oxygen of said atmosphere reacting with said starting polymer to produce said at least one modified polymer.

3. The cathode composition of claim 1, wherein the cathode composition forms a film deposited on a metal current collector, to form a cathode with said film, with a thickness of said film greater than 150 μm and lower than or equal to 250 μm.

4. The cathode composition of claim 1, wherein said sacrificial polymer phase comprises said at least one poly(alkene carbonate) polyol comprising end groups, more than 80 mol % of which comprise hydroxyl functional groups.

5. The cathode composition of claim 4, wherein said at least one poly(alkene carbonate) polyol is a linear aliphatic diol selected from the group consisting of a poly(ethylene carbonate) diol and a poly(propylene carbonate) diol with a weight-average molecular weight of between 500 g/mol and 5000 g/mol.

6. The cathode composition of claim 4, wherein
said at least one poly(alkene carbonate) polyol has a weight-average molecular weight of between 500 g/mol and 5000 g/mol, and
said sacrificial polymer phase further comprises a poly(alkene carbonate) with a weight-average molecular weight of between 20 000 g/mol and 400 000 g/mol.

7. The cathode composition of claim 4, wherein the cathode composition further comprises a reactive polysiloxane or polyisocyanate compound, said at least one poly(alkene carbonate) polyol being functionalized by grafting, to said end groups, siloxane or isocyanate groups which result from said reactive polysiloxane or polyisocyanate compound.

8. The cathode composition of claim 7, wherein said reactive polysiloxane or polyisocyanate compound is selected from the group consisting of an organodisiloxane and an organodiisocyanate.

9. The cathode composition of claim 1, wherein the cathode composition exhibits a porosity by volume, obtained by decomposition of said sacrificial polymer phase, of greater than 30%.

10. The cathode composition of claim 1, wherein said starting polymer for said polymeric binder consists of a nonhydrogenated acrylonitrile/butadiene copolymer (NBR) and/or a hydrogenated acrylonitrile/butadiene copolymer (HNBR) which each exhibit(s) a content by weight of units resulting from acrylonitrile equal to or greater than 40% and which is (are) crosslinked by said thermal oxidation reaction to give said at least one modified polymer.

11. The cathode composition of claim 10, wherein said starting polymer comprises said hydrogenated acrylonitrile/butadiene copolymer (HNBR) which exhibits:
a content by weight of units resulting from acrylonitrile equal to or greater than 44%, and/or
an iodine value, measured according to the standard ASTM D5902-05, of greater than 10%.

12. The cathode composition of claim 1, wherein said starting polymer is a nonpolar aliphatic hydrocarbon polyolefin and wherein said at least one modified polymer which results therefrom exhibits a content by weight of oxygen atoms of between 3% and 7% inclusive.

13. The cathode composition of claim 12, wherein said oxygenated groups of said at least one modified polymer comprise C=O, C—O and —OH bonds defining:
carbonyl groups comprising carboxylic acid, ketone and optionally ester functional groups,
aldehyde groups, and
alcohol groups.

14. The cathode composition of claim 12, wherein said nonpolar aliphatic hydrocarbon polyolefin is selected from the group consisting of a homopolymer of an aliphatic olefin, a copolymer of at least two aliphatic olefins and mixtures thereof.

15. The cathode composition of claim 14, wherein said nonpolar aliphatic hydrocarbon polyolefin consists of:
said homopolymer of an aliphatic mono-olefin, which is chosen from polyethylenes, polypropylenes, polybut-1-enes, polymethylpentenes and polyisobutylenes; or of
said copolymer of two aliphatic mono-olefins, chosen from ethylene/octene, ethylene/butene, propylene/butene, ethylene/butene/hexene copolymers and copolymers of ethylene and of an α-olefin including ethylene/propylene copolymers (EPM) and ethylene/propylene/diene terpolymers (EPDM).

16. The cathode composition of claim 1, wherein the cathode composition comprises:
greater than 85% by weight of said active material, which consists of said alloy of lithium nickel cobalt aluminum oxides,
less than 5% by weight of said polymeric binder, and
between 1% and 10% by weight of said electrically conductive filler, which is selected from the group consisting of a carbon black, a cellulose-derived carbon, an expanded graphite, a carbon fiber, a carbon nanotube, a graphene and mixtures thereof, said sacrificial polymer phase being at least partially removed by said thermal oxidation applied to said solvent-free precursor mixture.

17. The cathode composition of claim 14, wherein said nonpolar aliphatic hydrocarbon polyolefin exhibits a content by weight of units resulting from ethylene of greater than 50%.

18. The cathode composition of claim 17, wherein said nonpolar aliphatic hydrocarbon polyolefin is a copolymer of ethylene and of 1-octene, or an ethylene/propylene/diene terpolymer (EPDM).

\* \* \* \* \*